United States Patent
Barbour

(10) Patent No.: US 11,226,998 B2
(45) Date of Patent: Jan. 18, 2022

(54) SYSTEM AND METHOD FOR INFORMATION RETRIEVAL FOR NOISY DATA

(71) Applicant: Q2 Software, Inc., Austin, TX (US)

(72) Inventor: Jesse Lee Barbour, West Lake Hills, TX (US)

(73) Assignee: Q2 Software, Inc., Austin, TX (US)

( * ) Notice: Subject to any disclaimer, the term of this patent is extended or adjusted under 35 U.S.C. 154(b) by 34 days.

(21) Appl. No.: 16/883,623

(22) Filed: May 26, 2020

(65) Prior Publication Data

US 2020/0380021 A1    Dec. 3, 2020

Related U.S. Application Data

(60) Provisional application No. 62/855,328, filed on May 31, 2019.

(51) Int. Cl.
| | | |
|---|---|---|
| *G06F 7/00* | (2006.01) | |
| *G06F 16/33* | (2019.01) | |
| *G06N 3/04* | (2006.01) | |
| *G06F 16/31* | (2019.01) | |
| *G06F 16/16* | (2019.01) | |
| *G06F 16/387* | (2019.01) | |

(52) U.S. Cl.
CPC ........ *G06F 16/3334* (2019.01); *G06F 16/164* (2019.01); *G06F 16/313* (2019.01); *G06F 16/3344* (2019.01); *G06F 16/3347* (2019.01); *G06F 16/387* (2019.01); *G06N 3/0427* (2013.01)

(58) Field of Classification Search
CPC .. G06F 16/164; G06F 16/3347; G06F 16/313; G06F 16/387; G06F 16/3344; G06N 3/0427
USPC ......................................... 707/736, 748, 749
See application file for complete search history.

(56) References Cited

U.S. PATENT DOCUMENTS

| | | | | |
|---|---|---|---|---|
| 8,065,316 | B1 * | 11/2011 | Baker ................. | G06F 16/3325 707/768 |
| 8,429,167 | B2 * | 4/2013 | Taylor .................. | G06F 16/951 707/739 |
| 2004/0181525 | A1 | 9/2004 | Itzhak et al. | |
| 2005/0004790 | A1 | 1/2005 | Wu et al. | |
| 2006/0101060 | A1 | 5/2006 | Li et al. | |

(Continued)

OTHER PUBLICATIONS

Devlin, Jacob, et al., "BERT: Pre-Training of Deep Bidirectional Transformers for Language Understanding", Oct. 11, 2018, retrieved from <<https://arxiv.org/pdf/1810.04805.pdf>>, 14 pgs.

(Continued)

*Primary Examiner* — Md I Uddin
(74) *Attorney, Agent, or Firm* — Sprinkle IP Law Group

(57) ABSTRACT

Embodiments of systems and methods for information retrieval are disclosed. Embodiments of such systems and methods may perform information retrieval based on a language model that is used to generate a single vector for the search terms of a query. Similarly, a single vector representation of each of the data records to be searched is obtained and the single vector representing the search terms of the query compared to the single vector of each data record to determine a similarity metric. The resulting similarity metrics associated with each of the data records can be used to rank, present or return one or more data records.

21 Claims, 5 Drawing Sheets

(56) References Cited

U.S. PATENT DOCUMENTS

2008/0027910 A1  1/2008  Wen et al.
2017/0139965 A1  5/2017  Marquardt et al.

OTHER PUBLICATIONS

International Search Report and Written Opinion issued for PCT Application No. PCT/US2020/035131, dated Aug. 7, 2020, 11 pages.
Devlin et al., "BERT: Pre-Training of Deep Bidirectional Transformers for Language Understanding," May 24, 2019, [retrieved from <<https://arxiv.org/abs/1810.04805>>].

* cited by examiner

SYSTEM AND METHOD FOR INFORMATION RETRIEVAL FOR NOISY DATA

RELATED APPLICATIONS

This application claims a benefit of priority under 35 U.S.C. 119 of the filing date of U.S. Patent Application Ser. No. 62/855,328 filed May 31, 2019, entitled "METHOD SYSTEM AND METHOD FOR INFORMATION RETRIEVAL USING NOISY TRANSACTION DATA" by Jesse Lee Barbour, which is fully incorporated herein by reference for all purposes.

TECHNICAL FIELD

This disclosure relates generally to information retrieval. More specifically, this disclosure relates to the application of artificial intelligence based language processing techniques to information retrieval. Even more specifically, this disclosure related to systems and methods that use neural language models to enable accurate information retrieval, including the selection of one or more of a preexisting set of records which correspond to what may be particularly noisy queries.

BACKGROUND

A search engine, or information retrieval system, is a computer program used to index electronically stored information (referred to as a corpus) and search the indexed electronic information to return electronically stored information responsive to a search. Items of electronic information that form the corpus may be referred to interchangeably as (electronic) records, documents, files, objects, items, content, etc. and may include objects such as files of almost any type, including records, documents for various editing applications, emails, workflows, etc. In conventional information retrieval, a user (or an application) submits a query and the search engine selects a set of results from the corpus based on the terms of the search query. The terms of search queries usually specify words, terms, phrases, logical relationships, metadata fields to be searched, synonyms, stemming variations, etc.

Generally, there are two basic methods for selecting a set of results from a corpus based on a search query. In the first method, one or more items that meets the explicit search terms of the search query will be selected. Only items of the corpus that meet the explicit requirements of the search terms are selected and presented. In the second method, for some types of applications, the set of results selected is constrained (or further constrained) by a relevance measure. In particular, results selected by evaluating a search query as an explicit query are further scored and ordered by some criteria, and only the highest results are selected. Relevance scoring may incorporate variables such as the frequency of terms, weights on results with certain values or in specified metadata fields, distance from a value or a date, similarity to other results or objects, etc.

These types of searches may be employed in various different contexts and for various different purposes; however, in certain contexts one or the other type of search may prove more or less useful or apropos for a certain task. Certain areas have, however, proved difficult to the application of searches of either type. Such difficulty arises in large part because of the noisiness of either the search terms or the records of the corpus themselves.

Machine processing of data is accomplished significantly differently than human processing of data. Thus, machine processing of the data may alter the data in a manner that makes it significantly more opaque. Moreover, as such data may be processed through a set of steps or workflow, such alterations may accrete within the data or be compounded by subsequent steps such that at the end of the data processing a record may be substantially different than at the start of such processing. However, it may still be desired to correlate the resulting data with a set of existing data at some point during the processing.

An information retrieval task may be employed for such correlation by searching a corpus of existing data based on data resulting from such machine processing, but the noisiness of the resulting data makes the data ill-suited for use as the basis for generating search terms to be used to search corpus. This situation is especially true when it is desired to correlate the resulting data with human understandable or readable data. Moreover, as the resulting data may be processed in a different manner, or a different set of intermediate systems, not only is the resulting data in each instance noisy, but the noisiness introduced may have an element of randomness to it as well, further complicating the information retrieval task, as such noisiness cannot reliably reversed or "backed out" of the resulting data. Such problems manifest themselves in many contexts in the realm of distributed and networked computing environments.

To illustrate a specific example, many entities today have some sort of online presence (e.g., web site, mobile application, etc.) by which users can conduct activities through a distributed network. Users may utilize the web sites, applications, etc. of merchants, banks, credit or payment networks and the like to conduct online transactions such as credit card purchases through the online presence.

The online nature of these transactions, in turn dictates that these transactions are processed by the computing systems of the various online entities involved in such transactions. The data processing platforms utilized by these online entities (e.g., financial intuitions, card provider systems, etc.) to manage or otherwise process these online transactions are designed to accomplish the particular goals of the corresponding entities, and may produce transaction records that are not standardized and may not be easily interpreted. Thus, portions of the records may be altered, control characters removed or added, or other modifications made to an electronic transaction record.

Specifically, as transactions are processed by relevant entities, corresponding records may be used by the different institutions, and information may be added by each of these institutions so that there may be an increasing amount of information that accretes within transaction records for specific transactions. This accreted information may, in turn, contain errors that are propagated through the transaction system and may make portions of the information of such records indecipherable. For instance, in a purchase transaction record, it may be difficult to determine the merchant at which purchase was made from the transaction description itself. Thus, problems arise in computerized information retrieval arise in the context of transactions specifically because those transactions are conducted in an online environment using computing systems.

Prior art systems for classifying noisy information such as this type of transaction information commonly implement manually-encoded rules-based systems to cleanse and categorize this information. Often, these systems effectively "guess" at the proper interpretation of information within noisy records. These systems typically do not generalize well to novel classifications of previously unseen data (e.g., merchants or transaction descriptions). Further, these systems are often difficult to administer and must be manually maintained, which results in degraded accuracy in the classification of the interpreted transactional information.

It would therefore be desirable to provide systems and methods for overcoming one or more of the problems associated with information retrieval with respect to noisy (or other types of) data.

SUMMARY

Attention is thus directed to the systems and methods for information retrieval disclosed herein. Embodiments of such systems and methods may perform information retrieval based on a language model that generates a mathematical representation of the search terms of a query. The mathematical representation of each of the terms of the query can be weighted based on a weighting factor associated with each of the search terms, such as an inverse document frequency associated with the term. Each of the weighted mathematical representations for each of the search terms can then be combined into a single mathematical representation for the set of search terms. Similarly, a single mathematical representation of (e.g., the searchable portion) of each of the data records to be searched is obtained and the single mathematical representation of the query (e.g., of all the search terms of the query) compared to the single mathematical representation of each data record using a similarity metric derived from both mathematical representations. The resulting similarity metrics associated with each of the data records can be used to rank, present or return a highest ranked (e.g., most similar) data record, or (e.g., ranked) set of most similar data records.

An especially useful application of embodiments of such information retrieval systems and methods is in the context of retrieval of data records based on noisy search terms, where the noisy search terms may not exactly match the terms of the data records. As but one example, as discussed above, in many cases the online nature of electronic transactions necessitates that these transactions are processed by various computing systems of the various online entities involved in such transactions, where such processing may be tailored to the specific processing needs of the various entities involved. Such processing may therefore produce non-standard electronic transaction records where portions of the records may be altered, control characters removed or added, or other modifications made to the transaction record. This accreted information may, in turn, contain errors that are propagated through the transaction system and may make portions of the information of such records indecipherable. For instance, in an electronic transaction record, it may be difficult to determine the merchant at which purchase was made from the transaction description itself. In many cases, however, is important or desirable to be able to determine the merchant at which the online transaction was conducted.

Thus, as the merchant names in an electronic transaction record may be especially noisy, one domain in which embodiments of information retrieval systems and methods as disclosed herein be effectively utilized is in the location of merchants (also referred to as vendors) associated with a received electronic transaction record. Specifically, embodiments of systems and methods for information retrieval may be useful for identifying relevant portions of electronic transaction data (e.g., portions pertaining to the merchant with whom the transaction was conducted) and identifying associations between the identified portions of the electronic transaction records (e.g., a merchant portion) and records within an existing database of merchants.

In one exemplary embodiment, an electronic transaction record is examined to identify a portion of the record corresponding to a merchant (e.g., the merchant portion). The merchant portion may be incomplete, truncated, concatenated, or may contain other errors. Embodiments of the information retrieval systems and methods disclosed herein may usefully determine an association between the merchant portion of the record and one of an existing set of records that identify individual merchants. Specifically, when a transaction record is received the merchant portion of the transaction record (e.g., the portion of the transaction record associated with the merchant name or address) can be determined and the merchant portion tokenized to determine terms to use as a query. The language model of the information retrieval system can be applied to the terms of the merchant portion to generate a mathematical representation of the terms of the merchant portion. The mathematical representation of each of the terms of the merchant portion can be weighted based on a weighting factor associated with each of the terms, such as an inverse document frequency associated with the term. Each of the weighted mathematical representations for each of the terms of the merchant portion can then be combined into a single mathematical representation for the merchant portion of the transaction record.

Similarly, the information retrieval system may include a database of merchants records, where each merchant record comprises a merchant identification portion (e.g., a merchant name or location information such as an address). A single mathematical representation of the merchant identification portion for each of the merchant data records to be searched is obtained and the single mathematical representation of the merchant portion of the transaction record compared to the single mathematical representation of each merchant record being searched based on a similarity metric derived from both mathematical representations. The resulting similarity metrics associated with each of the merchant records can be used to rank, present or return a highest ranked (e.g., most similar) merchant record, or (e.g., ranked) set of most similar merchant records. In particular, in one embodiment, a merchant name or other merchant identification data (e.g., address) associated with the highest ranking merchant record may be returned or presented. The merchant record can, for example, then be associated with the transaction to provide the richer, more accurate information related to the merchant to supplement and in many cases correct the information in the transaction record.

In certain embodiments, a neural language model may be utilized as a language model to obtain mathematical representations of the search query terms and the data records. Such a neural langue model may be adapted to map text (e.g., a word, token or term, all used here interchangeably) onto a compact mathematical representation known as an "embedding" in a vector space. For any input text, then, the corresponding embedding generated by the neural langue model may capture the semantic or syntactic characteristics of that text. In many cases, the neural language model captures both the semantic and syntactic elements of text.

Such neural language models may be trained using specific set of data. Thus, by utilizing training data that is specific to a particular domain in which the information retrieval systems or methods are to be utilized, the neural language model may be trained on the specific tokens that may be utilized within the domain, and may thus more effectively generate accurate representations of the semantics or syntax of such tokens. For example, in instances where embodiments of an information retrieval system is utilized for searching merchant records based on merchant portion of electronic transaction records, the neural model may be trained at least in part on electronic transaction records (or the merchant portions thereof) in order to allow such a neural language model to better capture the semantic or syntactic characterization of the noisy terms that may appear in such electronic transaction records.

In certain cases, to achieve dual goals of both expanding the coverage of such neural language models and to enhance the usefulness of the neural language models within a specific domain, the neural language model may be trained on both a general corpus of text (e.g., such as Wkipedia or other large corpus of human written text, or portions thereof), and may also be trained on a specific corpus comprising tokens that may be utilized (or have been utilized) within a particular domain. For example, in the context of searching merchant records based on electronic transaction records, such a specific training corpus may comprise a set of historical electronic transaction records. To ease the computational intensity, time or use of computer resources that may be involved in training such a model, in some embodiments transfer learning may be employed, whereby a neural language model previously trained on a general corpus may be update or trained additionally based on the specific corpus desired.

Moreover, to further reduce the use of computational resources or increase the speed of certain embodiments, such a language model may be utilized to restrict the universe of data records that are searched. For example, the language model (e.g., the neural langue model in certain embodiments) may be utilized to determine terms semantically similar to the terms of the search query. This expanded set of terms can then be used to search the data records to determine data records including at least one of those expanded terms. Such a search may be accomplished, for example, using an index (e.g., an inverted index) or the like. Specifically, an index may be built from the tokenized elements of the documents in a corpus.

In the context of merchant names, for example, the merchant portion of a transaction record may be tokenized to determine to determine the terms to use as a query. The language model can be applied to each of these merchant portion terms from the transaction record to determine a set of related terms. The original terms determined from the merchant portion of the transaction record and the determined related terms thus form an expanded set of terms that can be used (e.g., via the index) to perform and initial search of the merchant records of the information retrieval system.

Once the set of data records responsive to the initial search based on the expanded set of terms is determined, the mathematical representation of the (e.g., original) terms of the query can be generated based on the language model while the single mathematical representations of (e.g., the searchable portion) of each of the set of data records determined based on the initial search can be obtained and the single mathematical representation of the query compared to the single mathematical representation of each of the set of data records based on a similarity metric derived from both mathematical representations. The resulting similarity metrics associated with each of the data records can be used to rank, present or return a highest ranked (e.g., most similar) data record, or (e.g., ranked) set of most similar data records. For merchant records, for example, a highest ranking merchant record can be associated with a received electronic transaction to provide the richer, more accurate information related to the merchant to supplement and in many cases correct the information in the transaction record. It should be noted that it may not be desirable to simply calculate these similarity measures across every entry in the database is because, in general, the similarity computation may become expensive across large sets of data.

Various embodiments are possible. For example, one embodiment comprises a system for performing the identification and retrieval of information associated with a transaction description as described herein. Another embodiment may comprise a computer program product that performs these functions, where the computer program product includes a non-transitory computer readable medium storing instructions executable by a processor to implement the identification and retrieval functions described herein. Yet another embodiment may comprise a method for performing the identification and retrieval functions described herein.

Accordingly, embodiments as disclosed may provide a number of advantages, including the quick and efficient retrieval of records associated with search terms, where those search terms may be noisy or otherwise not congruent with terms in the corpus to be searched. Embodiments may be particularly effective where those search terms may be utilized in a particular context, where data from that context is used to train a model that may be utilized by those embodiments. Moreover, embodiments may be effective even in cases where the noisiness of such data results from machine processing of the data utilized as search terms, and, as such, embodiments may be particularly effective when utilized in distributed networked computing environments.

It should be noted that, while the description of embodiments herein may be described in the context of the use of a neural language model in the identification and retrieval of merchant records corresponding to merchant identifiers in electronic transaction data, the same techniques and embodiments can be implemented in other contexts to find records that are associated with noisy information and to associate the identified records with the original information regardless of the type or context of such records or information. Thus, the electronic transaction data and merchant records discussed herein are exemplary only and are utilized to described embodiments herein without loss of generality. It should therefore be understood that embodiments may be usefully applied to search based on any type of noisy, and potentially inaccurate, descriptive data, and that the records that may include any type of records within a set of records that may be identified and associated with the noisy information to supplement or correct the noisy information.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1A:
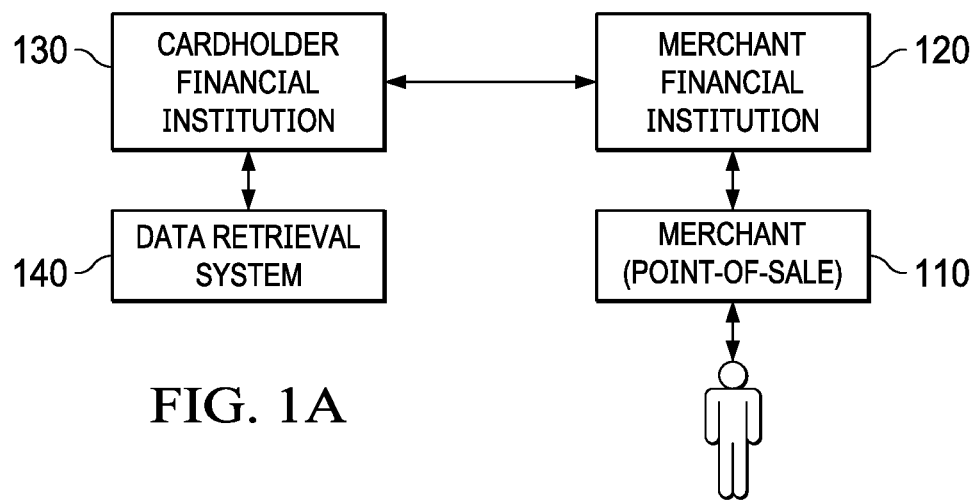
FIGS. 1A and 1B are a block diagram illustrating an information retrieval system for data processing in association with online transactions accordance with one embodiment.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements). Before describing embodiments in more detail, a brief overview of context may be helpful to an understanding of such embodiments. As discussed above, an information retrieval system, is a computer program used to search electronic information to return information responsive to a search. In conventional information retrieval, a user (or an application) submits a query and the search engine selects a set of results from the corpus based on the terms of the search query. The terms of search queries usually specify words, terms, phrases, logical relationships, metadata fields to be searched, synonyms, stemming variations, etc.

Certain types of data are less amenable to implementation of such searching functionality. Such difficulty arises in large part because of the noisiness of either the search terms or the records of the corpus themselves. Specifically, machine processing of the data may alter the data in a manner that makes it significantly more opaque. Moreover, as such data may be processed through a set of steps or workflows, such alterations may accrete within the data or be compounded by subsequent steps, such that at the end of the data processing a record may be substantially different than at the start of such processing. However, it may still be desired to correlate the resulting data with a set of existing data at some point during the processing.

An information retrieval task may be employed for such correlation by searching a corpus of existing data based on the resulting data, but the noisiness of the resulting data makes search difficult as the terms generated from the resulting data may not align with the terms on the existing data. A specific instance of this situation occurs in the context of electronic transaction records. Users may utilize the web sites or applications, of merchants or other online entities conduct online transactions such as credit card purchases through the online presence. The online nature of these transactions, in turn dictates that these transactions are processed by the computing systems of the various online entities involved in such transactions. The data processing platforms utilized by these online entities (e.g., merchants, financial intuitions, card provider systems, etc.) to manage or otherwise process these online transactions are designed to accomplish the particular goals of the corresponding entities, and may produce transaction records that are not standardized and may not be easily interpreted. Thus, portions of the records may be altered, control characters removed or added, or other modifications made to a transaction record.

It is desired in many instances to identify the merchant associated with an electronic transaction record. The identification may be modeled as an information retrieval task, whereby the merchant identification portion of an electronic transaction record may be used to search a database of merchant records to find the merchant record (including the merchant name) closest to the merchant portion of the electronic transaction record. However, in such an electronic transaction record, it may be difficult to utilize the merchant portion of the electronic transaction record to formulate a search because of the aforementioned problems with the noisiness of such electronic transaction record resulting from the online nature of the transaction itself. Thus, problems arise in computerized information retrieval arise in the context of electronic transactions specifically because those transactions are conducted in an online environment using computing systems.

It would therefore be desirable to provide systems and methods for overcoming one or more of the problems associated with information retrieval with respect to noisy (or other types of) data.

To address those needs, among others, embodiments of systems and methods for information retrieval are disclosed herein, where these embodiments may perform information retrieval based on a language model that generates a mathematical representation of the terms of a query (e.g., via a fixed-length, high-dimensional, dense embedding in a vector space). The mathematical representation of each of the terms of the query can be weighted based on a weighting factor associated with each of the terms, such as an inverse document frequency associated with the term relative to a corpus of records. Each of the weighted mathematical representations for each of the search terms can then be combined into a single mathematical representation for the set of search terms. Similarly, a single mathematical representation of (e.g., the searchable portion) of each of the data records to be searched is obtained and the single mathematical representation of the query (e.g., of all the search terms of the query) compared to the single mathematical representation of each data record based on a similarity metric derived from both mathematical representations. The resulting similarity metrics associated with each of the data records can be used to rank, present or return a highest ranked (e.g., most similar) data record, or (e.g., ranked) set of most similar data records.

An especially useful application of embodiments of such information retrieval systems and methods is in the context of retrieval of data records based on noisy search terms, where the noisy search terms may not exactly match the terms of the data records. As but one example, as discussed above, in many cases the online nature of electronic transactions produces non-standard noisy electronic transaction records where it may be difficult to determine the merchant at which purchase was made from the transaction record itself.

Thus, as the merchant names in an electronic transaction record may be especially noisy, one domain in which embodiments of information retrieval systems and methods as disclosed herein be effectively utilized is in the location of merchants associated with a received electronic transaction record. Embodiments of the information retrieval systems and methods disclosed herein may thus usefully determine an association between a merchant portion of an electronic record and one of an existing set of merchant records that identify individual merchants by searching the merchant records based on the merchant portion of the electronic transaction record. Specifically, when a transaction record is received the merchant portion of the transaction record (e.g., the portion of the transaction record associated with the merchant name or address) can be determined and the merchant portion tokenized to determine terms to use as a query. The language model of the information retrieval system can be applied to the terms of the merchant portion to generate a mathematical representation of the terms of the merchant portion. The mathematical representation of each of the terms of the merchant portion can be weighted based on a weighting factor associated with each of the terms, such as an inverse document frequency associated with the term. Each of the weighted mathematical representations for each of the terms of the merchant portion can then be combined into a single mathematical representation for the merchant portion of the transaction record.

Similarly, the information retrieval system may include a database of merchants records, where each merchant record comprises a merchant identification portion (e.g., a merchant name or location information such as an address). A single mathematical representation of the merchant identification portion for each of the merchant data records to be searched is obtained and the single mathematical representation of the merchant portion of the transaction record compared to the single mathematical representation of each merchant record being searched based on a similarity metric derived from both mathematical representations. The resulting similarity metrics associated with each of the merchant records can be used to rank, present or return a highest ranked (e.g., most similar) merchant record, or (e.g., ranked) set of most similar merchant records. In particular, in one embodiment, a merchant name or other merchant identification data (e.g., address) associated with the highest ranking merchant record may be returned or presented. The merchant record can, for example, then be associated with the transaction to provide the richer, more accurate information related to the merchant to supplement and in many cases correct the information in the transaction record.

In certain embodiments, a neural language model may be utilized as a language model to obtain mathematical representations of the search query terms and the data records. Such a neural langue model may be adapted to map text (e.g., a word, token or term, all used here interchangeably) onto a compact mathematical representation known as an "embedding" (or vector) in a vector space. For any input text, then, the corresponding embedding generated by the neural langue model may capture the semantic or syntactic characteristics of that text. Accordingly, in some embodiments to generate a single mathematical representation for a merchant portion of an electronic transaction record, the neural language model may be applied to each term of the merchant portion to generate a corresponding embedding for each term. The embeddings can then be combined (for example, summed) to generate a single mathematical representation for the merchant portion of the electronic transaction record based on the embeddings associated with each term of the merchant portion. Before the embeddings for each term are combined, each of the embeddings can be weighted based on a weighting factor associated with the corresponding term, such as an inverse document frequency associated with the term. In particular, in one embodiment, each of the embeddings (vectors) may be multiple by the scalar weighting factor (IDF value) for the corresponding term. The weighted embeddings for each term of the merchant portion of the electronic transaction record are then combined (e.g., summed or averaged) to generate the single mathematical representation for the merchant portion of the electronic transaction record.

Similarly, a single mathematical representation for the merchant identification portion for each of the merchant data records may be generated in a substantially similar manner, whereby an embedding is generated for each token of the merchant identification portion of the merchant record using the neural language model and the embeddings combined in the single mathematical representation. Before the embeddings for each term are combined, each of the embeddings can be weighted based on a weighting factor associated with the corresponding term, such as an inverse document frequency associated with the term as discussed. In this manner, the single mathematical representations of each of the merchant data records being compared to the single mathematical representation of the merchant portion of the transaction record may have been generated in a similar manner using the neural language model.

Moreover, to further reduce the use of computational resources or increase the speed of certain embodiments, such a language model may be utilized to restrict or otherwise scope the universe of data records that are searched. For example, the language model (e.g., the neural langue model in certain embodiments) may be utilized to determine terms semantically similar to the terms of the search query. This expanded set of terms can then be used to search the data records to determine data records including at least one of those expanded terms. Such a search may be accomplished, for example, using an index (e.g., an inverted index) or the like. In the context of merchant names, for example, the merchant portion of a transaction record may be tokenized to determine to determine the terms to use as a query. The language model can be applied to each of these merchant portion terms from the transaction record to determine a set of related terms. The original terms determined from the merchant portion of the transaction record and the determined related terms thus form an expanded set of terms that can be used to perform an initial search of the merchant records of the information retrieval system to scope the set of merchant records to be subsequently searched (e.g., using the mathematical representations).

It should be noted that, while the description of embodiments herein may be described in the context of the use of a neural language model in the identification and retrieval of merchant records corresponding to merchant identifiers in electronic transaction data, the same techniques and embodiments can be implemented in other contexts to find records that are associated with noisy information and to associate the identified records with the original information regardless of the type or context of such records or information. Thus, the electronic transaction data and merchant records discussed herein are exemplary only and are utilized to described embodiments herein without loss of generality. It should therefore be understood that embodiments are applicable to data processing and information retrieval in almost any computing environment in which highly accurate information retrieval based on noisy data is desired. All example embodiments described herein should therefore be construed without loss of generality as illustrative of the invention, rather than being limiting.

To illustrate the context of the applicability of certain embodiments then, attention is directed to FIG. 1A, where a block diagram of a distributed computing networked environment in which electronic transactions are conducted that includes an embodiment of an information (also referred to as data) retrieval system is depicted. Referring to FIG. 1A, a consumer may make a purchase of a product from a merchant. This merchant may operate a point-of-sale system 110 that allows the consumer to make the purchase using a credit card (or debit card). Such a point of sale system 110, may for example, be a credit card terminal in a store or an online presence such as a website or application. When the card is entered by the merchant (or the consumer) in the point-of-sale system, the credit card information is communicated to a financial institution 120 that is associated with the merchant in order to authorize the purchase.

The merchant's financial institution 120 may then communicate over one or more networks with a second financial institution 130 that is associated with the cardholder (the consumer) in order to determine whether to authorize the transaction. The first financial institution may, for instance, communicate the cardholder's credit card number and the amount of the purchase. The second financial institution 130 may then look up the cardholder's account and determine whether the cardholder has sufficient credit (or funds) to cover the purchase price. The second financial institution then communicates a "yes" or "no" to the first financial institution 120, indicating whether or not the account can cover the purchase. The first financial institution 120 will then communicate either an authorization for the purchase or a denial to the point-of-sale system 110. If the purchase is authorized, the merchant (or the merchant's website, etc.) will complete the transaction with the consumer. If the purchase is not authorized, the merchant will not complete the transaction with the consumer.

If the transaction is completed, the information associated with the transaction may be used in various ways. First and foremost, the transaction information will be used to enable payment of the various entities involved in the transaction. For instance, the merchant's financial institution 120 will provide payment for the purchase to the merchant, the cardholder's financial institution 130 will provide payment to the merchant's financial institution 120, and the cardholder's financial institution 130 will collect payment from the cardholder (consumer). An information retrieval system 140 may receive transaction information from the cardholder's financial institution 130 or another entity and use the transaction information for various purposes, some of which will be described below.

Figure 1B:
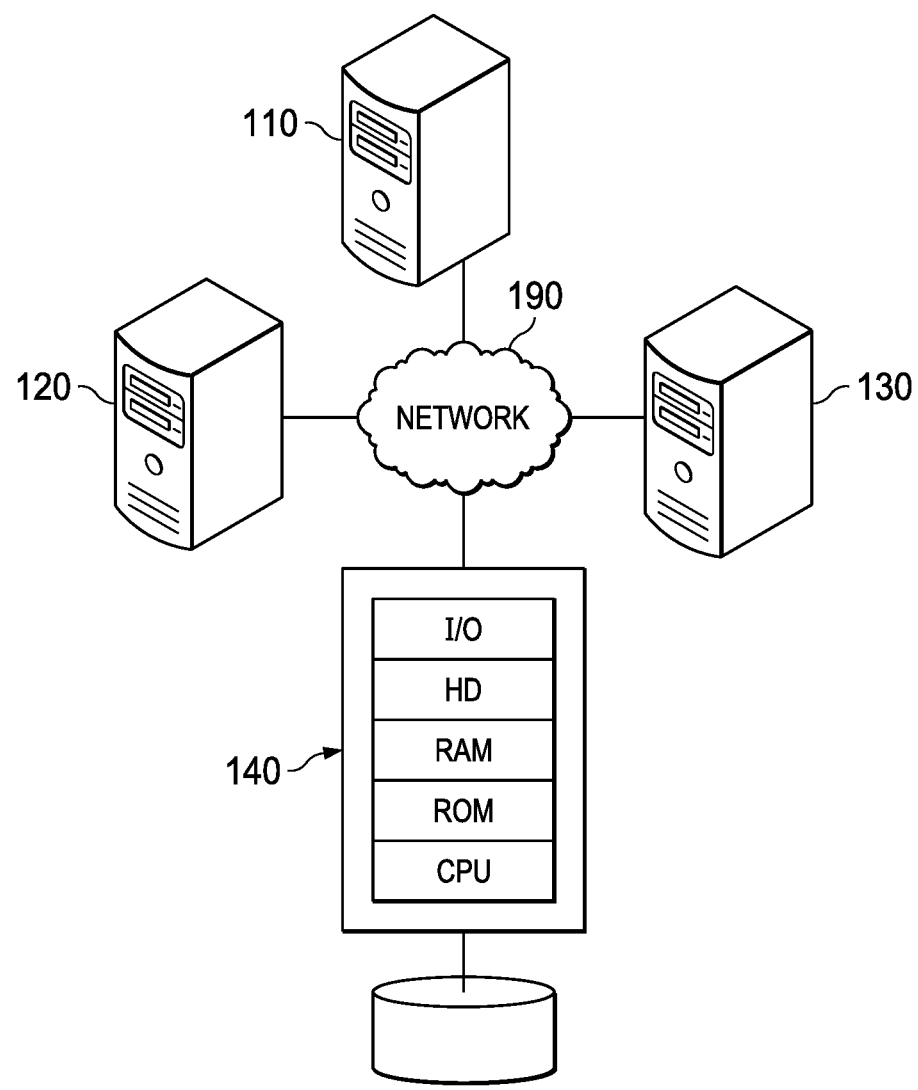

The system of FIG. 1A may be implemented in a distributed network computing environment. Referring to FIG. 1B, a diagrammatic representation of such an environment is illustrated. In this example, the network computing environment includes network 190 that can be bi-directionally coupled to a computing device of the information retrieval system 140. Computing devices (e.g., server systems) for the merchant point-of-sale system 110, the merchant's financial institution 120, and the cardholder's financial institution 130 can also be bi-directionally coupled to network 190. Network 190 may represent a combination of wired and wireless networks that the network computing environment may utilize for various types of network communications known to those skilled in the art.

For the purpose of illustration, a single system is shown for the computing device of information retrieval system 140, but information retrieval system 140 or other systems in the computing environment may use a plurality of computers or associated devices that are interconnected to each other (e.g., over network 190). Portions of the methods described herein may be implemented in suitable software code that may reside within ROM; RAM; or another storage device or medium. The instructions may be stored as software code elements on a data storage array, magnetic tape, floppy diskette, optical storage device, or other appropriate data processing system readable medium or storage device, including a non-transitory computer readable medium. Many other alternative configurations are possible and known to skilled artisans.

The information associated with transactions may be used for purposes such as categorization of the transaction. Commonly, the cardholder's financial institution will provide categorization information to the cardholder to assist of the cardholder in identifying the types of expenses the cardholder has incurred. The cardholder's institution may, for example, provide the cardholder with a monthly statement which identifies all transactions conducted during the preceding billing period and identifying an expense category associated with each of the transactions. This information may then be used by the cardholder for purposes such as budgeting. As many consumers have experienced, however, the categories that the financial institution associates with each transaction may not accurately reflect the type of expense that should be associated with the transaction. Consequently, the additional categorization information provided by the financial institution may actually be of little or no value to the consumer.

Problems such as this may arise for a number of reasons. For example, each time a transaction crosses a network or institutional boundary, it may accrete some "noise" (e.g., additional information may be added to the transactional data, or information may be reformatted) in the transaction data because of the many different interfaces and "standards" that are used by the involved entities, or because the different entities may uniquely manipulate the data. As the transaction data becomes noisier, the noise may obfuscate the details of the transaction, or may introduce spurious information. This may render much of the data confusing, so that it becomes difficult to understand the information in the transactional data.

Consider a scenario in which a cardholder's financial institution wishes to identify a merchant associated with a transaction. This information may be useful, for example, in categorizing the transaction. Prior art systems commonly examine the string of characters that comprise a transaction record and attempt to make a best guess as to the information that is represented by portions of the character string (e.g., using a rules-based approached). Take, for example, the character string:

IPX624THUDERCLDSUB . . . Austin,Tx. (07/2012)

A conventional system would typically attempt to "cleanse" the data in this character string and then make a "best guess" as to the meaning of one or more portions of the character string. For instance, the portion of the character string in ("THUDERCLDSUB") might be interpreted as the name of the merchant. The cleansing of these characters might consist of reformatting them, such as by separating the characters into multiple words and capitalizing each word (e.g., "Thundercld Sub"). The resulting text is the system's "best guess" at the merchant's name. Based upon this best guess, the system may see the word "Sub" and make the assumption that the merchant is associated with food. While this assumption may be correct in the case in which the merchant is a sandwich shop, the determination does not provide very much information. For instance, it does not provide any information as to the location of the merchant, the phone number of the merchant, or other similarly useful information associated with the merchant. It is also easy to see how, in many cases, assumptions about particular words in the string could cause inaccurate assumptions to be made as to the category with which transactions are associated. For example, a restaurant named "Spaghetti Warehouse" might be categorized as related to a utility (storage). Still further, these conventional systems persist errors and inaccuracies that exist in the character string (e.g., "Thundercloud" misspelled as "Thundercld"). Additionally, conventional systems are often ineffective when dealing with merchants or categories that were previously unseen, which is significant because merchants and categories are highly dynamic and change over time.

Embodiments of the information retrieval systems and methods presented herein may thus prove especially useful in such a context as embodiments may allow the identification and retrieval of accurate merchant information based upon the information that is available in the transaction data rather than making assumptions as to the information associated with the transaction character string. Thus, for example, instead of guessing that the name of the merchant in the above example is "Thundercld Sub", embodiments of the present systems and methods will use the merchant portion of the transaction data (e.g., a transaction character string) to find the closest match for "THUNDERCLDSUB" in a database of merchant records (e.g., that may be derived from listing data such as a Dun & Bradstreet listing or the like) and will then associate this closest match with the transaction data record. As a result, the merchant will be identified by the actual name of its business (e.g., "Thundercloud Subs" instead of "Thundercld Sub"). By associating the existing, accurate merchant listing with the transaction, the entity (e.g., user, cardholder financial institution or other submitter of the transaction record) will have access to additional information that is associated with the merchant, such as the business name, address, phone number, business type and various other information on the business. The entity can then more accurately and specifically perform tasks such as identifying and categorizing the transactions associated with the merchant.

Figure 2:
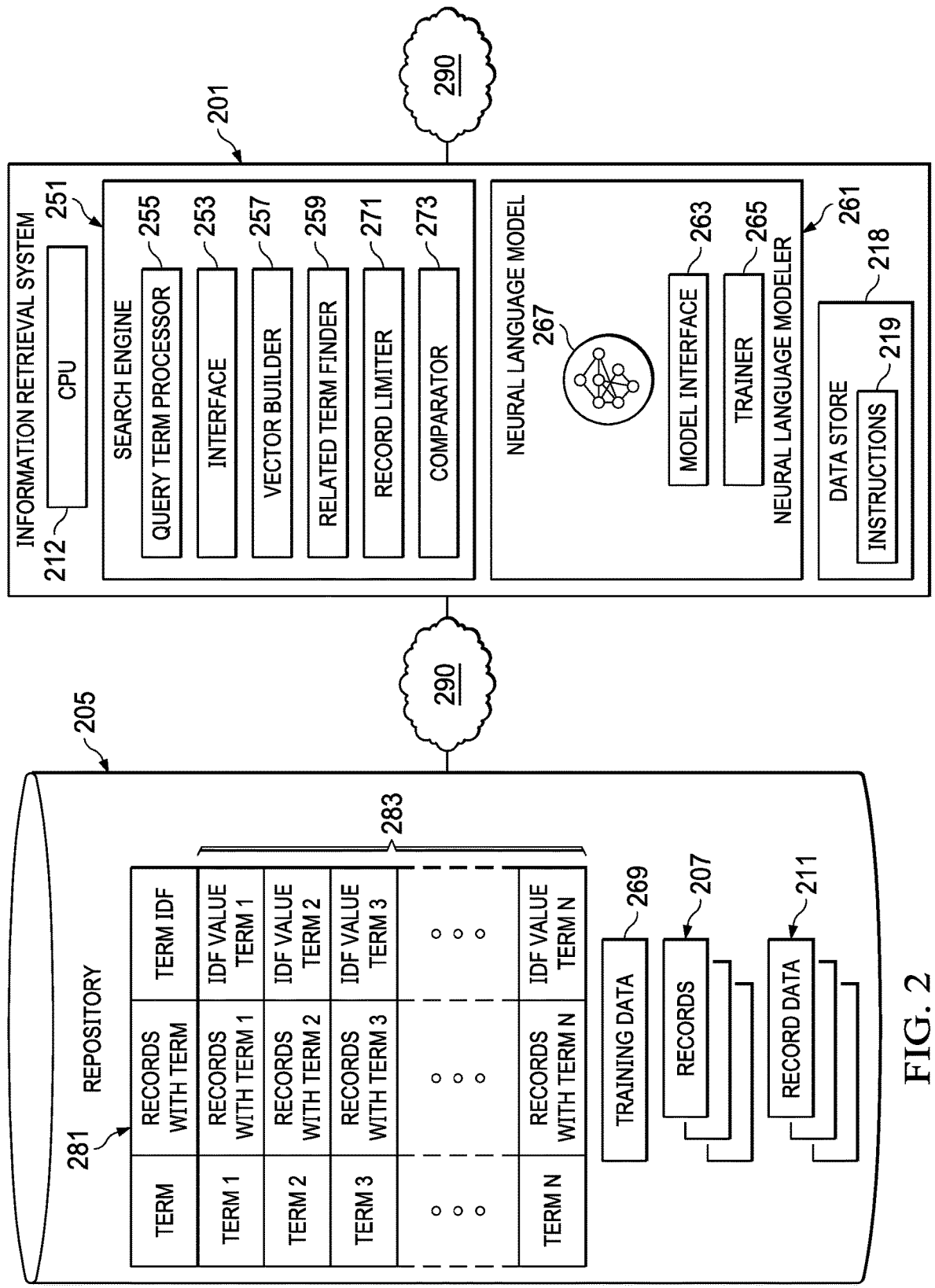
FIG. 2 is a block diagram illustrating a distributed network computing environment including an embodiment of an information retrieval system.

Moving then to FIG. 2, a block diagram of one embodiment of an information retrieval system is depicted. The information retrieval system 201 is part of computing environment including a repository 205 and information retrieval system 201 that may be coupled over network 290 (e.g., the Internet, a local area network (LAN), a wide area network (WAN), a cellular network or some other network or combination of networks, etc.) to one or more other computing devices (not shown). Repository 205 may comprise a file server or database system or other storage mechanism remotely or locally accessible by information retrieval system 201 which, according to an embodiment, may be almost any SQL or NoSQL platform such as Elasticsearch, MongoDB, or the like.

In the depicted embodiment information retrieval system 201 may include one or more (virtual or physical) servers or other type of computing device utilizing a central processing unit 212 connected to a memory and a data store 218 (e.g., via a bus). Central processing unit 212 may represent a single processor, multiple processors, a processor(s) with multiple processing cores and the like. Data store 218 may include a volatile or non-volatile non-transitory storage medium such as RAM, hard disk drives, flash memory devices, optical media or the like.

Data store 218 stores computer executable instructions 219. Computer executable instructions 219 can represent one or more multiple programs or operating system instructions. In one embodiment, instructions 219 are executable to provide search engine 251 and neural language modeler 261. Search engine 251 and neural language modeler 261 may be implemented on the same computing systems or can be distributed across multiple computing systems, platforms or physical or virtual server. Again, it will be noted here that while embodiments described and depicted with respect to FIG. 2 include a deployment of an information retrieval system 201 on a physical computing device other embodiments may include the document analysis system deployed as a service on, for example, a cloud computing environment or otherwise deployed without loss of generality.

Repository 205 may store records 207 that form a corpus that may be searched through the information retrieval system 201. Generally then, each record 207 may include a searchable portion that comprises data that may be utilized to search for that record. Such data may include, for example, text or numerical data or other types of data.

In one embodiment, for example, these records 207 may be merchant records that include merchant data associated with a merchant. Each merchant record may therefore comprise merchant identification information such as the merchant's name and the merchant's geographical information associated with the merchant such as an address or portions thereof, including for example, a street number and name, a city or state (or province, etc.) or postal code (e.g., a zip code). Each merchant record may, for example, include merchant data that may be obtained from listing data such as a Dun & Bradstreet listing or the like.

An index 281 may also be created for the records 207. This index 281 may serve to index the searchable portion of the data records 207, or some subset of the searchable portion. This index 281 may be created by search engine 251 and may include an identification of which records 207 include each term of a vocabulary defined by the records 207. For example, in the case where records 207 are merchant records, the index 281 may include a list of all the tokens of the merchant identification portions of these merchant records, along with an identification of each record including that token (e.g., in the merchant identification portion of the record).

In one embodiment, such an index 281 may be an inverted index. To describe such an index mathematically consider a set of merchants M and a vocabulary of terms V where each $m \in M$ is a sequence of tokens $\{t_1, \ldots t_n | t_i \in V, n \in \mathbb{N}\}$ of length n. For each distinct token $t \in V$, associate the set of merchants, $\{m_1, \ldots, m_p | m_i \in M\}$ in which t appears. The set of unique tokens, along with their associated merchants, comprise the inverted index I, where I(t) denotes the set of all merchants which contain the term t.

Thus, each entry 283 in the index 281 may include a term of the vocabulary utilized in the records 207 and an identification of each record 207 which includes that term. Moreover, in some embodiments, each entry 283 may also include a weighting associated with that term. In some embodiments, this weighting may be a measure or indication of the amount of information such a term is likely to convey given the commonality of that term across the vocabulary. Consider, for instance, the merchant name "The Grove Wine Bar #3." This name consists of the five tokens: "The," "Grove," "Wine," "Bar," and "#3." In this instance, the tokens "The" and "#3" do not convey an abundance of information because the terms are very common and generic in the vocabulary of vendor names. On the other hand, the terms "Grove," "Wine," and "Bar" are far less common and thus likely to convey more information with respect to the task of uniquely identifying a particular vendor.

Such a weighting associated with a term may be, for example, an inverse document frequency associated with the term. The inverse document frequency of a term is the logarithmically scaled inverse fraction of the records 207 that contain that term. Let N be the total number of records 207 in the corpus (e.g., merchants in the dataset of merchants where there is one record per merchant). For a given term, t, let $n_t$ represent the number of merchants in which the term t appears. Symbolically, it can be represented as $$IDF(t) = \log\left(\frac{N}{n_t}\right).$$

Neural language modeler 261 may include a model interface 263 and a trainer 265. Trainer 265 may train neural language model 267 based on training data 269 stored in the repository 205 of the information retrieval system 201. Neural langue model 267 may be adapted to map text (e.g., a word, token or term, all used here interchangeably) onto a compact mathematical representation known as an "embedding" in a vector space. For any input text, then, the corresponding embedding generated by the neural langue model may capture the semantic or syntactic characteristics of that text. Such neural language models 267 may be trained by trainer 265 using a specific set of data. Thus, by utilizing training data 269 that is specific to a particular domain in which the information retrieval systems or methods are to be utilized, the neural language model 267 may be trained on the specific tokens that may be utilized within the domain, and may thus more effectively generate accurate representations of the semantics or syntax of such tokens.

For example, in instances where embodiments of an information retrieval system 201 is utilized for searching merchant records based on merchant portion of electronic transaction records, the training data 269 may include historical electronic transaction records such that neural language model 267 may be trained at least in part on these electronic transaction records (or the merchant portions thereof) in order to allow such a neural language model 267 to better capture the semantic or syntactic characterization of the noisy terms that may appear in such electronic transaction records (e.g., in order to learn how language is used to identify and describe merchants).

In certain cases, to achieve dual goals of both expanding the coverage of such a neural language model 267 and to enhance the usefulness of the neural language models within a specific domain, the neural language model 267 may be trained on both a general corpus of text (e.g., such as Wikipedia or other large corpus of human written text, or portions thereof), and may also be trained on a specific corpus comprising tokens that may be utilized (or have been utilized) within a particular domain. For example, in the context of searching merchant records based on electronic transaction records, such a specific training corpus 269 may comprise a set of historical electronic transaction records. To ease the computational intensity, time or use of computer resources that may be involved in training such a model, in some embodiments transfer learning may be employed, whereby a neural language model previously trained on a general corpus may be update or trained additionally based on the specific corpus desired to generate the desired neural language model 267.

In order to achieve both accuracy and scale in certain embodiments, it may be important to obtain an effective vector representation of the terms. In order to achieve such a representation, the trainer 265 may train neural language model 267 according to the techniques outlined by Devlin et al. in "BERT: Pre-Training of Deep Bidirectional Transformers for Language Understanding" (available at https://arxiv.orq/pdf/1810.04805.pdf and fully incorporated herein by reference), such that the neural language model 267 may perform accurate and bidirectional encodings to represent of textual data. These encodings capture much of the semantic and lexical content of language and allow the embedding of text onto a vector space for efficient computation. This training process may yield a term-level vocabulary of embedding representations, consisting of a unique embedding representation for each term in a vocabulary, V. This embedding vocabulary represented in the neural language model may be utilized for information retrieval by the information retrieval system 201 as will be discussed.

Thus, by submitting a term though model interface 263 (e.g., through an embedding request or the like) an embedding (e.g., vector) for that term that captures the semantic or lexical content of that term may be determined using neural language model 267 and returned in response to that request. Additionally, by submitting a term, or an embedding vector associated with the term, through the model interface 263 (e.g., through a request for similar terms) a term, or set of terms that are semantically similar to the term or embedding submitted in the request may be returned in response to the request.

Search engine 251 may be configured to receive query records through an interface 253. Such query records may include information or data that the requestor desires to utilize to search records, or the query record itself may be a search query comprising a set of terms. The query term processor 255 may thus be configured for determining one or more search terms from the received query record.

These query records may for example, be electronic transaction records associated with a completed transaction. Such electronic transaction records may be submitted, for example, by almost any entity that desires to obtain a more definitive determination or identification of the merchant associated with the electronic transaction record. Such electronic transaction records may include a transaction description that comprises a merchant portion. The query term processor 255 may thus tokenize the merchant portion of a received transaction record to determine one or more (merchant) search terms from the merchant portion of the received transaction record.

Specifically, when a transaction record is received at the search engine through the interface 253, the query term processor 255 may parse the received electronic transaction record to determine the merchant portion of the received transaction record (e.g., the portion of the transaction record associated with the merchant name or address) and this merchant portion tokenized to determine terms to use as a query. Again, with reference to the example, the following character string may be received as part of an electronic transaction record.

IPX624THDERCKLDSUB . . . Austin, Tx (07/12)

The merchant portion of this record may be determined to be "THUNDERCLDSUB Austin,Tx" and the search terms determined from this merchant portion may be, for example "THUNDERCLD" and "SUB". In some embodiments, location information associated with the merchant may also be identified by the query term processor 255. This geographic location information (e.g., city, state, street number or name, etc.) may be included in the set of search terms associated with the received electronic transaction record, or may be separately identified as location information association with the electronic transaction record such that the location information may be used to restrict the universe of data records 207 that may be used in a search.

Once the search terms for an incoming query are determined by the query term processor 255, a single mathematical representation of these search terms determined from the incoming query may be created by the vector builder 257. Specifically, the search terms (e.g., the search terms determined from the merchant portion of the received electronic transaction record) may be provided to the vector builder 257. The vector builder 257 may obtain an embedding for each of the original search terms from the neural language modeler 261. Specifically, a request for an embedding for each of the originally determined search terms may be sent to the neural language modeler 261, which will utilize neural language model 267 to determine an embedding for that original search term and return that embedding to the vector builder 257. The vector builder 257 can then combine the embeddings for each of the original search terms (e.g., by summing the or averaging the values of the vectors) to create a single mathematical representation (e.g., a single vector) representing the entire set of original search terms.

In one embodiment, vector builder 257 may weight the embeddings of each of the original search terms before the embeddings are combined to create the single mathematical representation of the entire set of original search terms. The weighting factor utilized to weight the vector for a given original search term may be an inverse document frequency associated with that term. Thus, when vector builder 257 receives the embedding for an original search term from the neural language modeler 261 the vector builder 257 may access index 281 in repository 205 to determine the entry 283 in the index 281 associated with that original search term and, from the entry 283, the inverse document frequency for that original search term. The vector builder 257 can then weight the embedding using that the inverse document frequency for that original search term. Such a weighting may comprise, for example, performing a multiplication of the scalar value of the inverse document frequency for that original search term with the vector representing that original search term as returned from the neural language modeler 261. Accordingly, the vector builder 257 may determine a weighted vector for each of the original search terms, where these weighted vectors for each of the original search terms can them be combined (e.g., by summing the weighted vectors for each original search term) to create a single mathematical representation (e.g., a single vector) representing the entire set of original search terms.

The numeric structure of the embedding representations that may be created using neural language modeler 261 (e.g., by vector builder 257) may thus allow the use of mathematical operations for the measurement of similarity between words or phrases (or in, one embodiment, the similarity between the search terms for a merchant derived from the merchant portion of a received transaction record and the terms of a merchant identification portion of a merchant record). Therefore, in one embodiment, the search engine 251 can embed the determined search terms (S) using vector builder 257 and neural language modeler 261 (e.g., the merchant search terms derived from the merchant portion of the electronic transaction record) to create a single mathematical representation of the search terms (as discussed herein); embed the searchable portion (e.g., merchant identification portion, such as the merchant name) of each data record 207 (e.g., merchant record) using the vector builder 257 and neural language modeler 261 to create a single mathematical representation of the searchable portion of the data record 207 (as discussed herein) and measure the similarity between (e.g., the embedding representation of) S (e.g., merchant search terms) and (e.g., the embedding representation of) each data record 207 (e.g., the merchant name of each merchant record) in the repository 205. The data record 207 (e.g., merchant information) nearest to S can then be returned based on this comparison. In practice, however, information retrieval system 201 is usually utilized to evaluate hundreds or thousands of queries (e.g., received electronic transaction records) per second, and such determinations or comparisons of these types of embeddings may be less than desirable from a computational cost perspective, especially given the timing required in the processing of such a volume of queries.

Accordingly, in one embodiment, to further reduce the use of computational resources or increase the speed of certain embodiments, search engine 251 may restrict (scope) the universe of data records 207 (e.g., merchant records) that are searched through the comparisons of such embeddings. In order to scope the data records 207 that will be used for the comparisons of such embeddings, related term finder 259 may utilize neural language modeler 261 to determine terms semantically similar to the original search terms determined by the query term processor 255. Specifically, a request for an embedding for each of the originally determined search terms may be sent to the neural language modeler 261 which will utilize neural language modeler 267 to determine an embedding for that original search term and return that embedding in response to the request. The embedding for that original search term (or that search term itself) may then be provided to the neural language modeler 261 in a request for a related set of terms that are semantically similar to the original term. The neural language modeler 261 may utilize neural language model 267 to determine zero or more related term return these related terms in response to the request. The related set of terms may be added to the original set of search terms to form an expanded set of search terms. To describe it mathematically in terms of an example transaction record, if a merchant portion of transaction record includes d={$t_1, \ldots, t_l | t_i \in V, l \in \mathbb{N}$}, d can be expanded to include similar terms by taking d'={$rad(E_t,z)$}$\forall t \in d$, where $rad(E_t,z)$ collects all terms "near" t by identifying those within some radius z about $E_t$.

Record limiter 271 may utilize these expanded set of search terms determined by related term finder 259 to scope the universe of records 207 (e.g., merchant records) whose embeddings are to be utilized for comparison with the embedding of the search terms. Record limiter 271 may thus utilize the expanded set of terms to perform an initial search data record 207 to determine data records 207 including at least one of those expanded terms. Such a search may be accomplished, for example, using an index 281 (e.g., an inverted index) in the repository 205. For example, index 281 may be accessed based on each of the expanded set of terms. Each entry 283 corresponding to one of the expanded set of terms may be accessed in the index 281 to determine each record 207 that includes that term. The set of records including that expanded term may be added to the set of records (e.g., if it is not already in the set) comprising the scoped set of records 207 that is the search universe to utilize for the current search. Again, to describe it mathematically in terms of embodiments that utilize merchant records, a set of merchant records related to d can be located by taking $d_M = \{I(t) \forall t \in d'\}$. At this point, we have a search terms d from the merchant portion of the transaction record, and a set of related merchant records, $d_M$, where $d_M$ can be sorted in decreasing (or increasing) order of relevance to d.

In one embodiment, record limiter 271 may also scope the set of records to be used as the universe to utilize for subsequent comparison of embeddings using other criteria. For example, merchant portion of a received transaction record may include geographical information associated with the merchant such as an address or portions thereof, including for example, a street number and name, a city or state (or province, etc.) or postal code (e.g., a zip code) geographic location information (e.g., city, state, street number or name, etc.). Each of the records 207 (e.g., merchant records) may also include geographical location information associated with the merchant identified in the record. Thus, the geographical location information associated with a received electronic transaction record may be used to restrict the set of record 207, such that the scoped set of records 207 to be utilized for embedding comparisons may not include records 207 for merchants based on some geographic criteria (e.g., that are outside some distance from the geographical location defined in the location information obtained from the transaction record, are not in same market area or set of adjacent postal codes, etc.).

Once the scoped set of data records 207 on which to perform embedding comparisons is determined, vector builder 257 may build a single mathematical representation of the searchable portion of each of the scoped data records 207 (e.g., a merchant identification portion of a merchant record in the scoped set of data records) may be created by the vector builder 257. Specifically, for a particular data record 207 of the scoped set of records 207, the terms of the searchable portions (e.g., the tokens determined from the merchant identification portion of the merchant record) of that record may be determined by, or provided to, the vector builder 257. The vector builder 257 may obtain an embedding for each of the terms of the searchable portion of the data record 207 from the neural language modeler 261. Specifically, a request for an embedding for each of the terms of the data record 207 may be sent to the neural language modeler 261, which will utilize neural language model 267 to determine an embedding for that term and return that embedding to the vector builder 257. The vector builder 257 can then combine the embeddings for each of the terms of the searchable portion (e.g., merchant identification portion) of the data record 207 (e.g., by summing the vectors) to create a single mathematical representation (e.g., a single vector) representing the entire searchable portion (e.g., merchant identification portion) of the data record 207.

In one embodiment, vector builder 257 may weight the embeddings of each of the terms of the searchable portion of the data record 207 before the embeddings are combined to create the single mathematical representation of the entire set of the terms of the searchable portion. The weighting factor utilized to weight the vector for a given term may be an inverse document frequency associated with that term. Thus, when vector builder 257 receives the embedding for a term of the searchable portion from the neural language modeler 261, the vector builder 257 may access index 281 in repository 205 to determine the entry 283 in the index 281 associated with that term and, from the entry 283, the inverse document frequency for that term. The vector builder 257 can then weight the embedding using that the inverse document frequency for that term. Such a weighting may comprise, for example, performing a multiplication of the scalar value of the inverse document frequency for that term with the vector representing that term as returned from the neural language modeler 261. Accordingly, the vector builder 257 may determine a weighted vector for each of the terms of the searchable portion of the data record 207, where these weighted vectors for each of the terms of the searchable portion of the data record 207 can them be combined (e.g., by summing the weighted vectors for each of the terms or averaging the weighted vectors) to create a single mathematical representation (e.g., a single vector) representing the entire set of the terms of the searchable portion of the data record 207. Expressed mathematically, it may be understood that to map an arbitrary sequence of terms onto a single, fixed-length vector, embodiments may compute the average of all terms in the sequence of terms, weighting each term by its inverse document frequency value. Symbolically, for a sequence of terms s, the embedding of s via inverse document frequency pooling as described can be denoted as follows:

$$E_s = \frac{1}{|s|} \sum_{t \in s} IDF(t) * E_t$$

In one embodiment, the single mathematical representation for each data record 207 in the repository 205 may be computed at the time the record 207 is added to the corpus of records 207 such that the single mathematical representation of each record 207 is stored in record data 211 associated with each record 207 (or as part of record 207 itself). In this way, there is only a need to determine such a representation a single time, and such representations may be pre-computed before they are needed and stored in repository 205 in association with data records 207 for subsequent access.

Once the single mathematical representation (e.g., single vector) representing the set of original search terms (e.g., as determined from the merchant portion of an electronic transaction record) is obtained along with the single mathematical representation (e.g., single vector) representing the searchable portion (e.g., merchant identification portion or name) of each data record 207 (e.g., merchant record) in the scoped set of data records, comparator 273 may generate a similarity metric between the search terms and each of the data records 207 of the scoped set. Such a similarity metric for the search terms and a given data record 207 of the set of scoped data records 207 may be generated based on the respective single mathematical representations of each.

Specifically, the similarity metric may be based on a summation or other mathematical operation using the values of the single vector repressing the search terms and the single vector representing the searchable portion (e.g., merchant identification portion) of the data record 207. Based on the similarity metric generated between the single vector representing the search terms and each of the set of scoped data records 207, a most similar data record 207 (e.g., a most similar merchant record) may be identified by the search engine 251. The resulting similarity metrics associated with each of the data records 207 can be used to rank, present or return a highest ranked (e.g., most similar) data records 207 (e.g., merchant records), or a (e.g., ranked) set of most similar (e.g., merchant) records 207. In particular, in one embodiment, a merchant name or other merchant identification data (e.g., address) associated with a highest ranking merchant record may be returned or presented. The merchant record can, for example, then be associated with the transaction record received (and used to generate the search terms) in order to provide the richer, more accurate information related to the merchant to supplement or correct the information in the transaction record.

In one embodiment, expressed mathematically, a set of merchant records related to d is located by taking $d_M = \{I(t) \forall t \in d'\}$. Thus there are search terms d from the merchant portion of the transaction record, and a set of related merchant records, $d_M$, where $d_M$ can be sorted in decreasing (or increasing) order of relevance to d. An embedding representation for the set of search terms and the merchant identification portion of each data record is determined by taking $E_d$. Within this embedding representation space then, a similarity metric between two representations (A and B) can be defined as follows:

$$\text{sim}(A, B) = \frac{\sum_{i=1}^{p} A_i B_i}{\sqrt{\sum_{i=1}^{p} A_i^2} \sqrt{\sum_{i=1}^{p} B_i^2}}$$

Finally, in order to identify the most similar merchant to d, a maximum similarity can be determined according to:

$$\underset{r \in d_M}{\arg\max} \, \text{sim}(d, r)$$

It may now be useful to discuss particular embodiments of systems and methods as disclosed in more detail. Again, it should be noted that, while the description of embodiments herein may be described in the context of the use of a neural language model in the identification and retrieval of merchant records corresponding to merchant identifiers in electronic transaction data, the same techniques and embodiments can be implemented in other contexts to find records that are associated with noisy information and to associate the identified records with the original information regardless of the type or context of such records or information.

As can be seen from the above discussion, embodiments of the systems and methods for information retrieval used herein may make use of a neural language model to determine numerical vectors (which are also referred to as "word embeddings" or just "embeddings") associated with tokens in transaction data for a particular transaction. These vectors are used to identify semantically or syntactically) similar terms, and then the tokens and semantically similar terms are used to identify and retrieve records from a pre-existing database (e.g., data records associated with individual merchants). The neural network is then used to determine numerical vectors corresponding to the retrieved records. Distances are computed between these vectors and a vector for the tokenized merchant identification in the transaction data, and the retrieved records are ranked according to this distance. The one of the vectors of the data records which is closest to the vector for the tokenized merchant identification is then associated with the transaction. Embodiments of these systems and methods are described in more detail below in connection with FIGS. 3-8.

Figure 3:
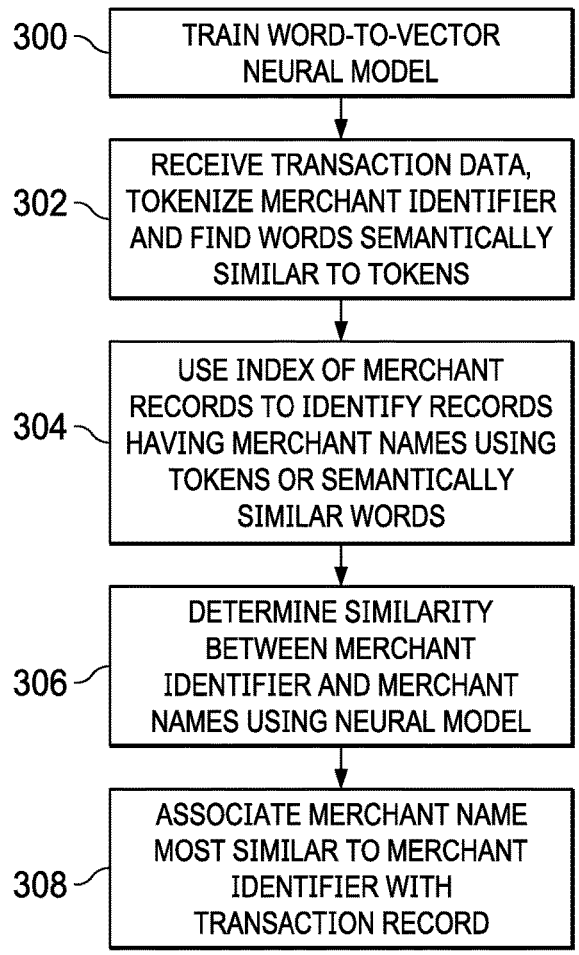
FIG. 3 is a flow diagram illustrating an information retrieval method in accordance with one embodiment.

Referring to FIG. 3, a flow diagram illustrating embodiments of a method for information retrieval that may be utilized by an information retrieval system is depicted. Initially, a neural language model that is configured to map terms into a multi-dimensional vector space is trained (STEP 300). The neural language model is preferably trained using text that is similar to the data transaction information that will later be processed by the neural language model. When descriptive transaction data for a transaction is received, a portion of the text that is associated with a merchant is identified and tokenized to determine an original set of search terms, and terms that are semantically similar to the tokens (e.g., the original set of search terms) are determined by using the neural language model to find vectors that are close to each other (STEP 302). The original set of search terms and the semantically similar terms thus form an expanded set of search terms.

An index for a database of merchant records is then searched using the expanded set of search terms (e.g., the tokens of the original search terms and their associated semantically similar terms) in order to identify merchant records that include the tokens and semantically similar words (STEP 304). Such a search can be accomplished, for example, using an index (e.g., an inverted index) formed from the terms of the merchant records in the database.

The neural language model is then used to determine the similarity between the merchant identification portion (e.g., merchant name) in each of the identified records and the merchant portion (e.g., merchant name identification) identified in the transaction data so that the merchant records can be ranked according to the similarity between the merchant identification portion of the record and the merchant portion of the transaction data (STEP 306). The merchant record that is determined to have a merchant identification portion (e.g., merchant name) that is the most similar to the merchant portion (e.g., merchant name identification) identified in the transaction data is then associated with the transaction (STEP 308).

Figure 4:
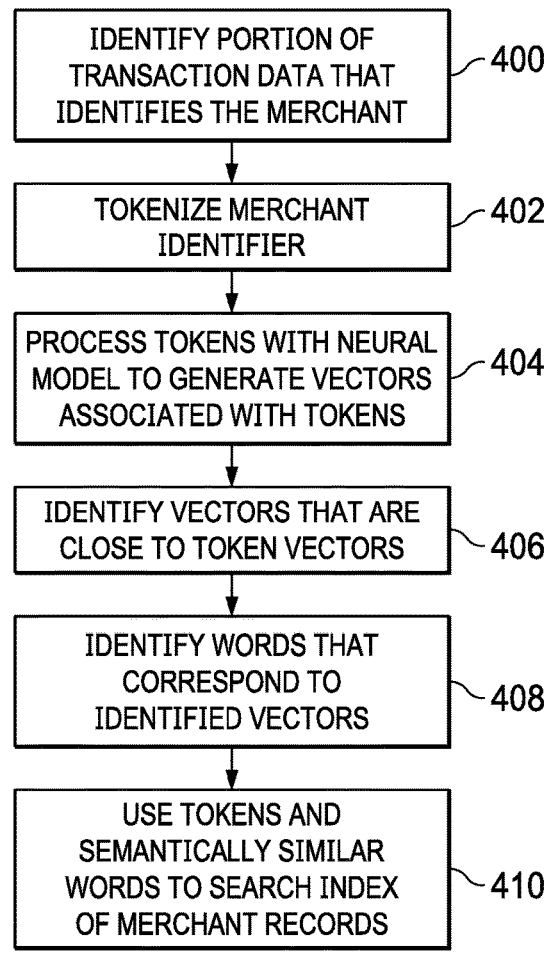
FIG. 4 is a flow diagram illustrating a method for identifying terms that are semantically similar to tokens in a transaction description in accordance with one embodiment.
Figure 5:
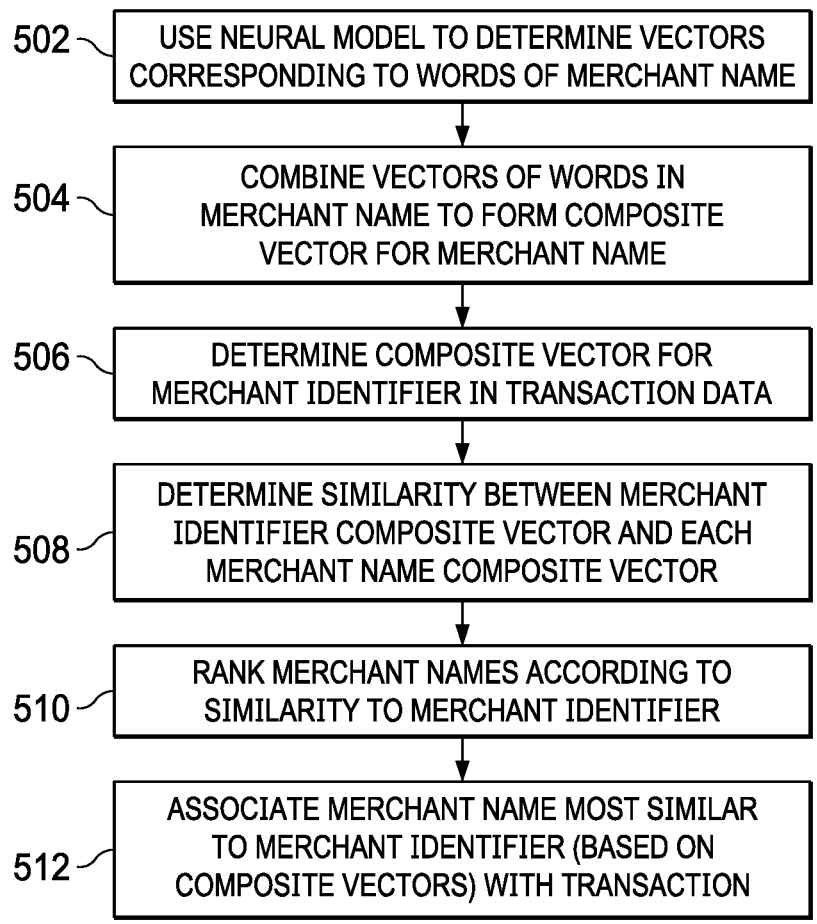
FIG. 5 is a flow diagram illustrating a method for identifying a merchant name that matches a merchant identifier in a transaction description in accordance with one embodiment.

Moving now to FIG. 4, a flow diagram illustrating embodiments of a method that may be employed by an information retrieval system for the identification of terms that are syntactically or semantically similar to tokens in the descriptive text (e.g., merchant portion) associated with a transaction record is depicted. As noted above, when the data for a transaction record is received, a merchant identification portion of the descriptive text that is associated with a merchant name is identified (STEP 400). This portion of the text is tokenized to identify terms (e.g., the original search terms) associated with the merchant name (STEP 402). Such tokenization may include the processing of concatenated text to determine individual tokens from such concatenated text (or any other type of single block of text). Each of the resulting tokens (e.g., the original search terms) is processed using the neural language model to determine a numerical vector that is associated with that token (STEP 404).

Vectors that are "close" to the vector for each token (e.g., the original search terms) can thus be identified (STEP 406). The "closeness" of the vectors may be determined, for example, by identifying vectors that are within a predetermined distance of the vector for the token (e.g., using Euclidean distance, cosine distance or some other distance measure). Each of the identified vectors that falls within a defined distance of a vector for that token (e.g., the original search term) represents a term that is syntactically or semantically similar to that token (e.g., the original search term). The identified vectors are then processed by the neural language model to determine the actual term that is associated with each identified vector (STEP 408). These identified terms are considered to be syntactically or semantically similar to the token (e.g., the original search term), and are stored for use in a subsequent index search of the database of merchant records (STEP 410). These identified terms may then be added to the original set of tokens (e.g., the original search terms) to form an expanded set of search terms comprising the tokens of the original search terms and their associated semantically similar terms.

After the syntactically or semantically similar terms (to the original search terms) are identified, the expanded set of terms are used to search the database of merchant records using an index for those merchant records. Thus, continuing with the example where the original search terms determined from a transaction record may be "Thundercld" and "Sub", rather than simply searching the index using the token "sub", the index may also be searched using the terms "sandwich", "hoagie", and any other terms that are determined to be semantically similar to "sub". The index search can thus identify specific records within the database of merchant records to utilize as a scoped set of records for further processing.

The merchant records identified through the index search (e.g., the scoped set of merchant records) may then be ranked using the neural language model. Embodiments of a method for a ranking process that may be employed by embodiments of an information retrieval system are illustrated in the flow diagram of FIG. 5. For each of the scoped set of merchant records (e.g., the merchant records responsive to the index search based on the expanded set of search terms), each individual term of the merchant identification portion of the merchant record (e.g., the merchant name) is evaluated using the neural language model to determine a corresponding numerical vector for that individual term (STEP 502). Then, for each merchant record, the vectors for each of the terms in the merchant identification portion of that merchant record (e.g., the merchant name) are combined to form a composite vector corresponding to the entire (or a utilized portion of the) merchant identification portion (e.g., the entire merchant name) of that merchant record (STEP 504).

Before combining the vectors for each of the terms of the merchant identification portion of a merchant record, each of the vectors for each of the terms may be weighted. The vector for a term may be weighted, for example, using a weight corresponding to that particular term such as inverse document frequency associated with the term. The weighted vectors for each of the terms in the merchant identification portion of the merchant record (e.g., the merchant name) can then be combined to form a composite vector that is a single vector representing the entire (or a utilized portion of the) the merchant identification portion (e.g., the entire merchant name) of the merchant record weighted according to each term. Any suitable method for computing the composite vector (e.g., adding the weighted vectors for each term, multiplying the weighted vectors, etc.) may be used. For instance, a weighted average of the weighted vectors for the terms in the merchant identification portion (e.g., merchant name) may be computed. Thus, each merchant identification portion (e.g., merchant name) in each of the identified merchant records may be represented by a single numerical vector. Intuitively, this process may yield a single neural (vector) representation of a phrase with the most important terms in the phrase contributing most prevalently.

In one embodiment, the composite vector for each merchant record may be computed at the time the record is added to the corpus of records such that the composite vector representation of each record is stored in association with the merchant record and may be accessed or otherwise obtained for subsequent comparison when needed. In this way, there is only a need to determine such a composite vector a single time, and such a composite vector may be pre-computed before they are needed for subsequent access.

The neural language model is also used to determine a composite vector for the merchant portion of the transaction record (STEP 506). This composite vector for the merchant portion of the transaction record may be determined in substantially the same manner as the composite vectors for the merchant identification portion (e.g., merchant name) of the merchant records. Thus, each individual term of the merchant portion of the transaction record (e.g., the merchant name identifier included in the transaction record) is evaluated using the neural language model to determine a corresponding numerical vector for that individual term. Then, the vectors for each of the individual terms in the merchant portion of the transaction record (e.g., merchant name identification) are combined to form a composite vector corresponding to the entire (or a utilized portion of the) merchant portion of the transaction record. Again, before combining the vectors for each of the terms of the merchant portion of the transaction record (e.g., merchant name identification), each of the vectors for each of the terms may be weighted using, for example, a weight corresponding to that particular term, such as inverse document frequency associated with the term. The weighted vectors for each of the terms in the merchant portion of the transaction record (e.g., merchant name identification) can then be combined to form a composite vector that is a single vector representing the entire (or a utilized portion of the) the merchant portion (e.g., merchant name identification) of the transaction record.

The composite vector for the merchant portion (e.g., merchant name identification) in the transaction data can then be compared to the composite vector for each of the scoped set of merchant records to determine the similarity between them (STEP 508). In one embodiment, this comparison may be accomplished by computing a "distance" between the composite vectors, with the smallest distance representing the most similar vectors. The scoped set of merchant records may then be ranked according to the computed similarity (the smallest distance between the corresponding vector and the vector of the merchant identification in the transaction data) (STEP 510). The merchant record that is most similar to the merchant identification in the transaction data is identified as the merchant associated with the transaction (STEP 512).

Once this merchant record is identified as being associated with the transaction record, all of the information stored in the identified merchant record may become available for use in connection with that transaction. Thus, for example, the cardholder's financial institution will know that the actual name of the merchant is "Thundercloud Subs", rather than "Thundercld Sub", and will know the location, phone number, and other information associated with the merchant. The financial institution may then use the available information for the benefit of its cardholders. For example, the additional information may enable the financial institution to provide substantially more accurate and more specific information regarding the categorization of the merchant (e.g., the transaction with merchant "Thundercloud Subs" may be accurately and reliably categorized not simply as food, but more specifically as fast food, sandwich shop, or some other category specifically associated with this merchant).

An example of the operation of portions of the systems and methods in accordance with one specific embodiment is described below in connection with FIGS. 6-8. In these examples, descriptive data (e.g., a transaction record) associated with a transaction may be received by the information retrieval system. The information retrieval system is configured to determine a portion of the descriptive data that is indicative of the name of the merchant associated with the transaction (e.g., a merchant portion or merchant name identification portion of the electronic transaction record). In this example, assume that the merchant portion in the transaction record is indicated by the text "BOBSBURG-ERS". In this embodiment, the information retrieval system has been trained to identify tokens from concatenated words, and it will be assumed for the purposes of this example that the information retrieval system identifies the tokens in the merchant portion (e.g., the merchant name identification) of the transaction record as "Bobs" and "Burgers". These terms will thus be the terms used as search terms to search the merchant records of the information retrieval system.

Figure 6:
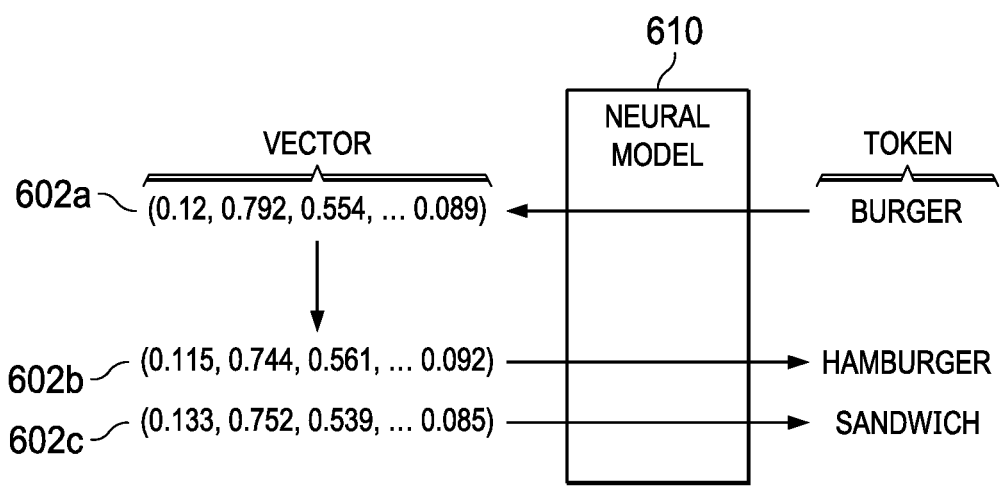
FIG. 6 is a diagram illustrating the use of a neural language model to identify terms that are semantically similar to tokens in a transaction description in accordance with one embodiment.

Moving now to FIG. 6, a diagram illustrating the vectorization of tokens is depicted. As indicated in the figure, the token "burger" is processed by the information retrieval system using the neural language model 610 to produce a vector 602 associated with the token ("burger"). The vector 602 is multidimensional, with the vector 602 having a single scaler value corresponding to each of the dimensions. The neural language model 610 may be trained according to the techniques outlined by Devlin et al. in "BERT: Pre-Training of Deep Bidirectional Transformers for Language Understanding" (available at https://arxiv.orq/pdf/1810.04805.pdf and fully incorporated herein by reference), such that the neural language model 610 may perform accurate and bidirectional encodings to represent of textual data. These encodings capture much of the semantic and lexical content of language and allow the embedding of text onto a vector space for efficient computation. The dimensions of the vectors 602 produced by the neural language model 610 may not have any direct correspondence to specific words, phrases or other characteristics that are identifiable by a user, but nevertheless uniquely map specific inputs (words) to specific vectors.

The vector 602*a* that is generated by the neural language model 610 to represent the token "burgers" is may then be used by embodiments of an information retrieval system to identify nearby vectors 602*b,* 602*c.* "Nearby" vectors are vectors which fall within a certain radius of the reference vector (in this example, the vector 602*a* corresponding to "burgers"). Such a radius may be configurable, may be determined during training of the neural language model 610 or may be determined by some other methodology. The distance between two vectors may be computed according to many different metrics, including for example, as the square root of the sum of the squares of the components.

Any vectors that are identified within the given distance of the reference vector represent terms that are considered to be semantically the same as the term corresponding to the reference vector. As depicted in the example of FIG. 6, two vectors 602*b,* 602*c* are identified which are close to the reference vector 602*a* for "burgers". These vectors 602*b,* 602*c* may be utilized by the neural language model 610 to determine the corresponding terms for those nearby vectors 602*b,* 602*c,* which in this example are "hamburgers" (the term corresponding to vector 602*b*) and "sandwiches" (the term corresponding to vector 602*c*). It should be noted here that these semantically similar words are intended to be illustrative, and do not necessarily represent an exhaustive list of the words that might be considered similar. Thus, in this example, the terms "hamburgers" and "sandwiches" are determined to be semantically similar to "burgers" using neural language model 610 even though the terms are syntactically different. As can be seen then, using neural language model 610 vectors for terms may be determined, where those terms may be utilized, for example, to determine composite vectors as discussed or to determine related terms from another (e.g., an original term) (e.g., which may be used for scoping a set of merchant records).

Figure 7:
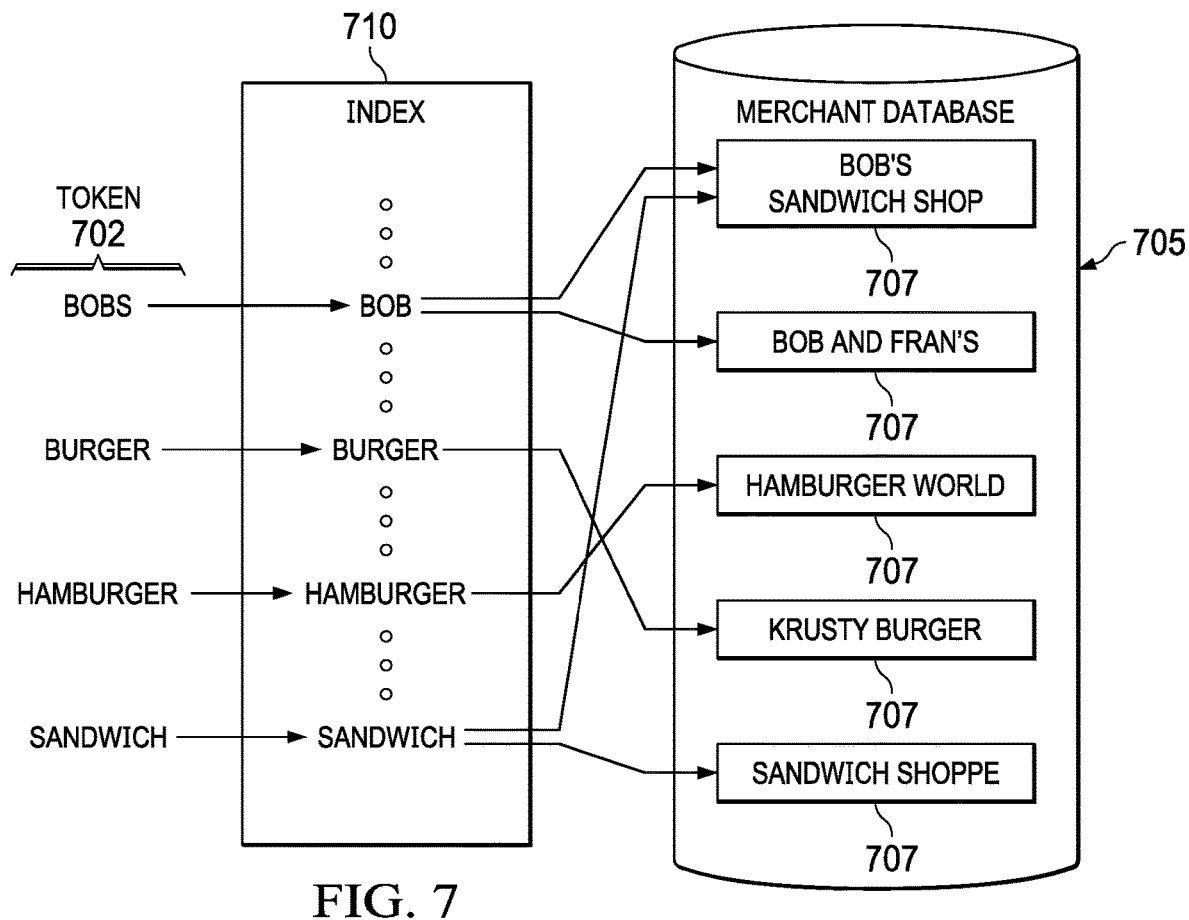
FIG. 7 is a diagram illustrating the use of a token and semantically similar words to identify merchant records via an index in accordance with one embodiment.
Figure 8:
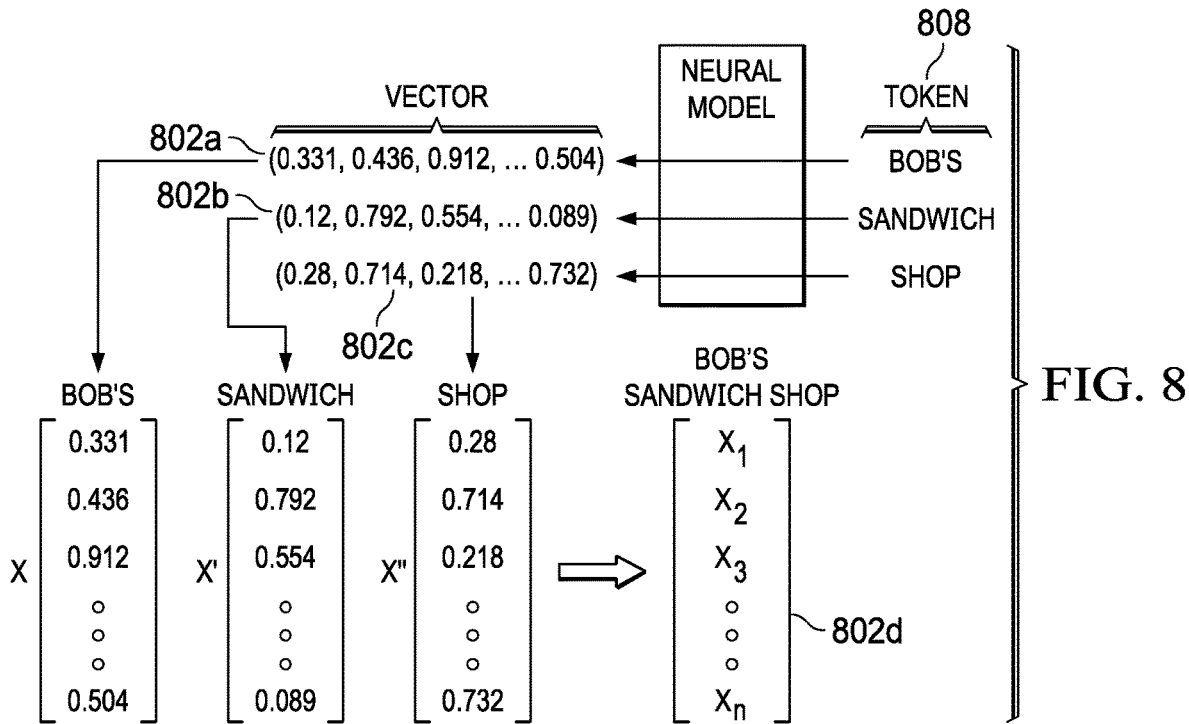
FIG. 8 is a diagram illustrating the use of a neural model to construct a composite vector corresponding to a merchant name in accordance with one embodiment.

Looking at FIG. 7, a diagram illustrating an example of the identification (e.g., and access) of merchant records from a database in accordance with an embodiment of an information retrieval. As depicted, in certain embodiment of an information retrieval system the tokens (e.g., the original terms as determined from a transaction record) and the corresponding semantically similar terms (e.g., the expanded search terms) are used to search an index of merchant records to determine a scoped set of merchant records to use for subsequent comparisons. The information retrieval system looks up each of the set of expanded search terms 702 in an index 710 of the merchant records in the merchant database 705 to identify merchant records 707 that include the corresponding term. In this manner, embodiments of an information retrieval system may better make semantic connections between the terms as determined from a transaction record and an actual merchant name to expand the search based on such semantic connections, thus addressing, for example, common issues in point of sale systems where terms of an actual merchant name are replaced by synonyms, abbreviations or other terms.

Each of the identified records 707 in this embodiment corresponds to a single merchant and has an associated merchant name. While the index search may identify many records 707 in the database 705, only a few are shown in the figure by way of example. Here, for instance the search for the term "Bob" may return merchant records 707 with the name "Bob's Sandwich Shop" and "Bob and Fran's"; the search for the term "Burger" may return merchant records 707 with the name "Krusty Burger"; the search for the term "hamburger" may return merchant record 707 with the name "Hamburger World" and the search for the term "sandwich" may return merchant records 707 with the name "Bob's Sandwich Shop" and "Sandwich Shoppe."

Once a list of merchant records is identified and the merchant names are retrieved from the database, the merchant records are ranked according to the similarity of the merchant name of the merchant record to the merchant identifier originally determined from the transaction data of the transaction record. Such a ranking may be accomplished by comparing a single composite vector determined from the tokens of the merchant identifier originally determined from the transaction data and a single composite vector This composition of such a composite vector is illustrated in the example FIG. 8. As depicted, the terms 808 of a merchant name (here "Bob's Sandwich Shop") from each merchant record are processed using the neural language model 810 to generate vectors 802 corresponding to each of the terms in the merchant name. Thus, for example, a first vector 802a is generated for the term "Bob's", a second vector 802b is generated for the term "Sandwich", and a third vector 802c is generated for the term "Shop". These three vectors 802a, 802b, 802c are then used to generate a composite vector 802d that corresponds to the merchant name "Bob's Sandwich Shop".

In this embodiment, the composite vector 802d is formed by first multiplying the vector 802a, 802b, 802c for each term by a corresponding weighting factor (x). The weighting factor may reflect, for example, a relative importance of the term (e.g., relative to the corpus of merchant records). Such a weighting factor may be, for example, an inverse document frequency associated the corresponding term. Thus, for example, the weighting factor (x) may be an inverse document frequency of the term "Bob's" in the corpus of merchant records, the weighting factor ($\chi'$) may be an inverse document frequency of the term "Sandwich" in the corpus of merchant records, and the weighting factor ($\chi''$) may be an inverse document frequency of the term "Shop" in the corpus of merchant records. The resulting weighted vectors can then be combined to form composite vector 802d corresponding to the merchant name "Bob's Sandwich Shop" by, for example, averaging the resulting weighted vectors. Similarly, although not shown in the figure, the words that form the merchant names for the other scoped set of merchant records (in this example "Bob and Fran's", "Krusty Burger", "Hamburger World" and "Sandwich Shoppe") would be processed to generate a numerical vector for each of the terms of the name, and these would be combined to form a composite vector for the merchant name.

A composite vector is also generated for the merchant identifier from the transaction data (or the terms as determined from the merchant identification in the transaction data record). The composite vector corresponding to the merchant identifier from the transaction data can then be compared to each of the composite vectors of each of the scoped set of merchant records. Thus, the composite vector corresponding to the merchant identifier from the transaction data may be used as a reference vector for determining the similarity of the vectors corresponding to the scoped set of merchant records. The similarity between the merchant identification in the transaction data record and a (merchant name of a) merchant record is determined by computing a distance between the reference vector and the merchant record vector (the composite vector determined for the merchant name of that merchant record). After the distance of each merchant vector from the reference vector (i.e., the similarity of the composite merchant record vector to the reference vector) has been determined, the merchant record vectors are ordered or ranked, and the merchant record vector having the (e.g., smallest) distance to the reference vector is identified. This (top-ranked or highest ordered) merchant record vector (e.g., with the smallest distance to the reference vector) corresponds to the merchant name and that is most similar to the merchant identifier in the transaction data. In the example illustrated in FIGS. 6, 7 and 8 for instance, the merchant name "Bob's Sandwich Shop" may be identified and associated with the transaction record where the merchant portion of the transaction record includes the text "BOBSBURGERS" (e.g., based on a semantic association between the terms), despite that the text of the merchant name and the merchant portion of the transaction record are different.

The record for this merchant or the merchant name for the merchant or other merchant data in the merchant record can then be associated with the transaction originally identified in the transaction data. For example, when the merchant record has been associated with the transaction, the information in the merchant record can be used in connection with the transaction. Thus, for instance, if a cardholder's financial institution wishes to categorize the transaction, the categorization may be based on the specific information contained in the merchant record, rather than assumptions or "best guesses" about the incomplete and possibly inaccurate information in the transaction data itself.

Again, it should be noted that, while the above disclosure focuses on examples relating to the identification and retrieval of merchant information associated with a particular purchase transaction, the information retrieval techniques disclosed herein may have many other applications in many other fields other. The specific examples above should therefore be construed as illustrative of the techniques, rather than limiting. Various applications of these techniques will be apparent to skilled persons upon reading this disclosure.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

To the extent particular values are provided in any example embodiments in the description, such values are provided by way of example and not limitation. Moreover, while in some embodiments rules may use hardcoded values, in other embodiments rules may use flexible values. In one embodiment, one or more of the values may be specified in a registry, allowing the value(s) to be easily updated without changing the code. The values can be changed, for example, in response to analyzing system performance.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An information retrieval system, comprising:
a processor;
a data store comprising data records, each of the data records including a searchable portion;
a non-transitory computer readable medium comprising instruction for:
receiving a set of search terms;
determining a vector for each of the set of search terms using a language model, where the vector represents the corresponding search term;
generating a weighted vector for each of the search terms, wherein generating the weighted vector for a search term comprises multiplying the vector for that search term by a weighting factor corresponding to that search term;
generating a first composite vector representing the entire set of search terms by combining the weighted vectors for each of the search terms;
determining a set of the data records by searching the data records based on the set of search terms;
obtaining a second composite vector for each of the set of data records, wherein the second composite vector for a data record represents the entire searchable portion of the corresponding data record, wherein the second composite vector for each data record is generated by:

determining a set of terms of the searchable portion of the data record;

determining the vector for each of the set of terms of the searchable portion of the data record using a language model, where the vector represents the corresponding term of the set of terms of the searchable portion;

generating the weighted vector for each of the set of terms of the searchable portion of the data record, wherein generating the weighted vector for a term of the searchable portion of the data record comprises multiplying the vector for that term by the weighting factor corresponding to that term; and generating the second composite vector representing the entire set of terms of the searchable portion of the data record by combining the weighted vectors for each of the set of terms of the searchable portion of the data record;

determining a similarity of between the first composite vector representing the entire set of search terms and the second composite vector of each data record representing the set of terms of the searchable portion of that record data record based on a distance between the first composite vector and the second composite vector;

ranking the set of data records based on the similarity determined between the first composite vectors and each of the second composite vectors for the set of data records; and identifying a top-ranked data record based on the ranking of the set of date records.

2. The system of claim 1, wherein the language model is a neural language model.

3. The system of claim 2, wherein the weighting factor is an inverse document frequency associated with that term.

4. The system of claim 1, wherein searching the data records comprises:

determining a set of expanded search terms based on the set of search terms by determining a set of related terms related to each search term based on the neural language model;

adding the determined related terms to the set of search terms to form the expanded set of search terms; and searching the data records based on the expanded set of search terms.

5. The system of claim 1, wherein the search of the data records is accomplished using an index corresponding to the data records stored in the repository.

6. The system of claim 5, wherein the set of the data records is determined based on a geographical criteria associated with the search terms and the set of data records.

7. The system of claim 1, wherein the search terms are derived from a merchant identification portion of an electronic transaction record, the data records are merchant records, and the searchable portion of each of the merchant records comprises a merchant name.

8. A method for information retrieval, comprising:

receiving a set of search terms for searching data records on a data store, each of the data records including a searchable portion;

determining a vector for each of the set of search terms using a language model, where the vector represents the corresponding search term;

generating a weighted vector for each of the search terms, wherein generating the weighted vector for a search term comprises multiplying the vector for that search term by a weighting factor corresponding to that search term;

generating a first composite vector representing the entire set of search terms by combining the weighted vectors for each of the search terms;

determining a set of the data records by searching the data records based on the set of search terms;

obtaining a second composite vector for each of the set of data records, wherein the second composite vector for a data record represents the entire searchable portion of the corresponding data record, wherein the second composite vector for each data record is generated by:

determining a set of terms of the searchable portion of the data record;

determining the vector for each of the set of terms of the searchable portion of the data record using a language model, where the vector represents the corresponding term of the set of terms of the searchable portion;

generating the weighted vector for each of the set of terms of the searchable portion of the data record, wherein generating the weighted vector for a term of the searchable portion of the data record comprises multiplying the vector for that term by the weighting factor corresponding to that term; and generating the second composite vector representing the entire set of terms of the searchable portion of the data record by combining the weighted vectors for each of the set of terms of the searchable portion of the data record;

determining a similarity of between the first composite vector representing the entire set of search terms and the second composite vector of each data record representing the set of terms of the searchable portion of that record data record based on a distance between the first composite vector and the second composite vector;

ranking the set of data records based on the similarity determined between the first composite vectors and each of the second composite vectors for the set of data records; and identifying a top-ranked data record based on the ranking of the set of date records.

9. The method of claim 8, wherein the language model is a neural language model.

10. The method of claim 9, wherein the weighting factor is an inverse document frequency associated with that term.

11. The method of claim 8, wherein searching the data records comprises:

determining a set of expanded search terms based on the set of search terms by determining a set of related terms related to each search term based on the neural language model;

adding the determined related terms to the set of search terms to form the expanded set of search terms; and searching the data records based on the expanded set of search terms.

12. The method of claim 8, wherein the search of the data records is accomplished using an index corresponding to the data records stored in the repository.

13. The method of claim 12, wherein the set of the data records is determined based on a geographical criteria associated with the search terms and the set of data records.

14. The method of claim 8, wherein the search terms are derived from a merchant identification portion of an electronic transaction record, the data records are merchant records, and the searchable portion of each of the merchant records comprises a merchant name.

15. A non-transitory computer readable medium comprising instructions for:
- receiving a set of search terms for searching data records on a data store, each of the data records including a searchable portion;
- determining a vector for each of the set of search terms using a language model, where the vector represents the corresponding search term;
- generating a weighted vector for each of the search terms, wherein generating the weighted vector for a search term comprises multiplying the vector for that search term by a weighting factor corresponding to that search term;
- generating a first composite vector representing the entire set of search terms by combining the weighted vectors for each of the search terms;
- determining a set of the data records by searching the data records based on the set of search terms;
- obtaining a second composite vector for each of the set of data records, wherein the second composite vector for a data record represents the entire searchable portion of the corresponding data record, wherein the second composite vector for each data record is generated by:
  - determining a set of terms of the searchable portion of the data record;
  - determining the vector for each of the set of terms of the searchable portion of the data record using a language model, where the vector represents the corresponding term of the set of terms of the searchable portion;
  - generating the weighted vector for each of the set of terms of the searchable portion of the data record, wherein generating the weighted vector for a term of the searchable portion of the data record comprises multiplying the vector for that term by the weighting factor corresponding to that term; and
  - generating the second composite vector representing the entire set of terms of the searchable portion of the data record by combining the weighted vectors for each of the set of terms of the searchable portion of the data record;
- determining a similarity of between the first composite vector representing the entire set of search terms and the second composite vector of each data record representing the set of terms of the searchable portion of that record data record based on a distance between the first composite vector and the second composite vector;
- ranking the set of data records based on the similarity determined between the first composite vectors and each of the second composite vectors for the set of data records; and
- identifying a top-ranked data record based on the ranking of the set of date records.

16. The non-transitory computer readable medium of claim 15, wherein the language model is a neural language model.

17. The non-transitory computer readable medium of claim 15, wherein the weighting factor is an inverse document frequency associated with that term.

18. The non-transitory computer readable medium of claim 15, wherein searching the data records comprises:
- determining a set of expanded search terms based on the set of search terms by determining a set of related terms related to each search term based on the neural language model;
- adding the determined related terms to the set of search terms to form the expanded set of search terms; and
- searching the data records based on the expanded set of search terms.

19. The non-transitory computer readable medium of claim 15, wherein the search of the data records is accomplished using an index corresponding to the data records stored in the repository.

20. The non-transitory computer readable medium of claim 19, wherein the set of the data records is determined based on a geographical criteria associated with the search terms and the set of data records.

21. The non-transitory computer readable medium of claim 15, wherein the search terms are derived from a merchant identification portion of an electronic transaction record, the data records are merchant records, and the searchable portion of each of the merchant records comprises a merchant name.

* * * * *